(12) United States Patent
Naji et al.

(10) Patent No.: US 8,383,031 B2
(45) Date of Patent: Feb. 26, 2013

(54) METHOD FOR MODIFYING PORE SIZE DISTRIBUTION ZONES IN FIBER CEMENT COMPOSITES AND ARTICLES OF MANUFACTURE OF THE SAME

(75) Inventors: Basil Naji, Toongabbie (AU); Donald J. Merkley, Alta Loma, CA (US); Michael Zammit, Lidcombe (AU); Caidian Luo, Alta Loma, CA (US)

(73) Assignee: James Hardie Technology Limited, Dublin (IE)

( * ) Notice: Subject to any disclaimer, the term of this patent is extended or adjusted under 35 U.S.C. 154(b) by 0 days.

(21) Appl. No.: 13/173,253

(22) Filed: Jun. 30, 2011

(65) Prior Publication Data

US 2011/0303123 A1 Dec. 15, 2011

Related U.S. Application Data

(62) Division of application No. 10/530,770, filed as application No. PCT/AU03/01315 on Oct. 7, 2003, now Pat. No. 7,993,570.

(60) Provisional application No. 60/417,076, filed on Oct. 7, 2002.

(30) Foreign Application Priority Data

Mar. 21, 2003 (AU) ................................. 2003901529

(51) Int. Cl.
*C04B 14/10* (2006.01)
(52) U.S. Cl. ....................................... 264/642; 106/721
(58) Field of Classification Search ................. 264/46.3, 264/45.4, 642; 162/154, 157.1; 106/718
See application file for complete search history.

(56) References Cited

U.S. PATENT DOCUMENTS

| 2,156,311 | A | | 5/1939 | Schuh |
| 5,482,550 | A | | 1/1996 | Strait |
| 5,935,699 | A | | 8/1999 | Barber |
| 5,945,044 | A | * | 8/1999 | Kawai et al. ................ 264/37.29 |
| 6,030,447 | A | * | 2/2000 | Naji et al. ....................... 106/718 |
| 6,506,248 | B1 | * | 1/2003 | Duselis et al. ................. 106/713 |
| 6,572,697 | B2 | | 6/2003 | Gleeson |
| 6,676,745 | B2 | | 1/2004 | Merkley |
| 7,993,570 | B2 | | 8/2011 | Naji et al. |
| 2002/0088584 | A1 | * | 7/2002 | Merkley et al. ............... 162/173 |
| 2011/0303123 | A1 | * | 12/2011 | Naji et al. ...................... 106/672 |

FOREIGN PATENT DOCUMENTS

| DE | 3308917 | 12/1986 |
| EP | 1088800 | 4/2000 |
| JP | 6144911 | 5/1994 |

(Continued)

OTHER PUBLICATIONS

Supplementary Partial European Search Report Dated Jan. 22, 2008, for corresponding European Application EP03747712.

(Continued)

*Primary Examiner* — Galen Hauth
(74) *Attorney, Agent, or Firm* — Knobbe Martens Olson & Bear, LLP (57) ABSTRACT

A cementitious product and method of modifying the properties of a low or medium density FRC product by providing a predetermined pore size distribution. The pore size distribution is obtained such that in critical zones of the distribution, the pore volume is substantially equivalent to or less than the pore volume in a respective critical zone of a conventional high density FRC product. The resultant material provides improved properties over conventional medium density FRC products, in particular improved freeze/thaw durability and/or improved workability.

7 Claims, 7 Drawing Sheets

FOREIGN PATENT DOCUMENTS

| | | |
|---|---|---|
| JP | 11099512 | 4/1999 |
| WO | WO 01/68547 | 9/2001 |
| WO | WO 02/28795 | 4/2002 |
| WO | WO 02/28796 | 4/2002 |
| WO | WO 02/070425 | 9/2002 |
| WO | WO 02/072499 | 9/2002 |

OTHER PUBLICATIONS

Examiner's First Report on corresponding Australian Patent Application No. 2003266828 dated Feb. 5, 2009.
International Search Report for PCT/AU2003/01315 dated Nov. 12, 2003.

* cited by examiner

METHOD FOR MODIFYING PORE SIZE DISTRIBUTION ZONES IN FIBER CEMENT COMPOSITES AND ARTICLES OF MANUFACTURE OF THE SAME

This application is divisional application under 35 U.S.C. §121 to U.S. application Ser. No. 10/530,770 filed Oct. 6, 2005, now U.S. Pat. No. 7,993,570 a National Phase application filed under 35 U.S.C. §371 of International Application No. PCT/AU2003/001315, filed Oct. 7, 2003, which claims the benefit of U.S. Application No. 60/417,076, filed Oct. 7, 2002 and Australian Application No. 2003901529, filed Mar. 31, 2003.

BACKGROUND OF THE INVENTION

1. Field of the Invention

The present invention relates to fibre reinforced cement products and methods for modifying the properties of those products for particular purposes.

2. Description of the Related Art

Any discussion of the prior art throughout the specification should in no way be considered as an admission that such prior art is widely known or forms part of common general knowledge in the field.

Generally, fibre reinforced composites may be divided into three groups based on their density.

High density reinforced composites have a density range above 1.6 to about 1.9 $g/cm^3$. These composites may be formed in a conventional fashion involving matting of fibres, catchment of slurried fines and dewatering, eg the Hatschek process followed by compression of up to 30 MPa pressure to the desired thickness.

Such high density FRC materials have high structural strength, high stiffness and a smooth finish. One particularly desired advantage of high density products is their ability to resist moisture ingress thereby retain as-manufactured physical or chemical properties in service.

Unfortunately, however, many high density FRC products do not have good handlabilty, nailability and can be difficult to score and snap. There is also a high capital and maintenance cost involved in the production technique.

Medium density FRC products with a density from about 1.2 to 1.6 $g/cm^3$ overcome some of the difficulties mentioned above. Even though they are normally formed in a conventional fashion, eg Hatschek process, they can be produced for relatively low cost compared with high density FRC products, have improved workability, ie handleability, score-snap, nailability and provide adequate structural strength and stiffness for most applications. Further, they generally have acceptable in service performance.

Conventional medium density FRC products, however, may not generally have the same level of resistance to moisture ingress and ability to maintain in-service performance as high density products. Further, they may not provide the flat smooth surface produced on high density products without additional coating and/or sanding.

Low density fibre reinforced composites with a density of around 0.8 to 1.1 $g/cm^3$ are also formed in a conventional fashion, e.g. Hatschek and normally incorporate a density modifier.

These low density products have excellent workability, i.e. handleability, score and snap and nailability due to their low density. They provide acceptable in-service performance and have adequate stiffness.

Such low density products, however, generally have lower structural strength and stiffness. Ability to maintain physical and chemical properties in service is generally lower and once again, surface flatness could be improved. Due to the specialised formulation of most low density fibre reinforced composites, they are produced at a relative high cost.

Accordingly, it will be appreciated by persons skilled in the art that it would be useful to be able to modify the properties of a medium or low density product such that they retain their advantageous properties, eg workability relatively low cost etc, but improve other properties, eg ability to maintain as-manufactured properties, resistance to moisture ingress, structural strength and stiffness and surface flatness.

Performance in extreme climactic conditions is a particularly difficult area. For example, in many geographical locations, the FRC product may be subject to many freeze/thaw cycles during its life. Some conventional medium density FRC material produced may suffer from delamination, softening or chipping when exposed to freeze/thaw cycles.

Loss of as-manufactured physical or chemical properties can also be triggered by internal factors such as imperfections relating to the material heterogeneity, eg air pockets, segregation of constituents. In the case of fibre reinforced composite materials, imperfections such as poor bond at the matrix-fibre interface and fibre clumping may render such materials more susceptible to loss of durability.

It is an object of the present invention to overcome or ameliorate at least one of the disadvantages of the prior art, or to provide a useful alternative.

SUMMARY OF THE INVENTION

In a first aspect, a method of modifying the properties of a low or medium density FRC product comprises providing the low or medium density FRC product with a predetermined pore size distribution such that in particular critical zones of said distribution, the pore volume is substantially equivalent to or less than the pore volume in a respective critical zone of a conventional high density FRC product.

In a preferred embodiment, the predetermined pore size distribution is obtained by chemical modification, physical modification, or a combination of chemical and physical modification.

In another aspect, the pore size distribution is obtained by including a predetermined quantity of pore modifying components into the cementitious formulation. In one embodiment, the pore modifying components include lignocellulosic fibres treated with a water repellent agent and microfine siliceous material such as silica fume.

Alternatively, or in addition to such chemical alteration of the pore size distribution, the low or medium density FRC product may be subjected to a light press to provide the required predetermined pore size distribution. The pressure applied to the low or medium density FRC product is sufficient to provide the desired predetermined pore size distribution and provide a density of no greater than about 1.6 gms per $cm^3$. Preferably, the density of the resultant FRC product is between about 1.1 and 1.55 grams per $cm^3$.

The present applicants have found that there are a range of properties of the low or medium density FRC product which may be altered by controlling the pore size distribution of the resultant product. They have also discovered that it is not necessary to control the entire pore size distribution but rather said distribution in critical zones, eg in the region of 1 to 10 microns mean pore diameter size and in the region of 10 to 100 microns mean pore diameter size. These regions, sometimes referred to as the fibre pore and air pore regions, are critical to some of the resultant properties of the low or medium density FRC product. The applicants have found that it is possible to provide a pore volume in these critical regions which is no greater than around 150% of the pore volume in a corresponding pore size range of a conventional high density FRC product while still maintaining a low or medium density, ie a density below about 1.6 g/cm$^3$. The resultant product has improved properties over conventional materials and in particular improved durability in a freeze/thaw environment.

In a preferred embodiment, the predetermined pore sized distribution is obtained to provide improved freeze/thaw durability of the FRC product.

In another embodiment, the predetermined pore size distribution is obtained to provide reduced propensity to carbonation or differential carbonation of the FRC product.

In a further aspect, the present invention provides a method of providing a low or medium density FRC product, comprising the steps of:

i) providing a formulation for a low or medium density product;

ii) forming a green article from said formulation;

iii) curing said green article to form said product;

wherein prior to step iii)

a) pore size modifying agent(s) are added to the formulation and/or b) the green shaped article is subjected to a light press such that the pore volume of the product is reduced as compared with a conventional product emanating from steps i) to iii) while maintaining a density of no greater than about 1.6 g/cm$^3$.

In still a further embodiment, step (i) mentioned above can be provided into stages A formulation for a medium density product may be prepared and a density modifier added to reduce the density of the formulation below 1.1 to 1.55 grams per cm$^3$. Light pressing then via step (b) brings the product back towards the medium density range of about 1.1 to 1.55 grams per cm$^3$.

In still a further aspect, the present invention provides a method of modifying the properties of a low or medium density FRC article comprising adjusting the pore size distribution of the article such that over a particular pore size range, the total pore volume is no greater than about 150% of the pore volume in a corresponding pore size range of a conventional high density FRC product.

The present invention also provides a cementitious product comprising a body constructed from fibre reinforced cement and having a density of no more than about 1.6 grams/cm$^3$ wherein the product has a predetermined pore size distribution such that in particular critical zones of said distribution, the pore volume is substantially equivalent to or less than the pore volume in a respective critical zone of a conventional high density FRC product.

BRIEF DESCRIPTION OF THE DRAWINGS

The present invention will now be described by way of example only, with reference to the accompany drawings in which.

DETAILED DESCRIPTION OF THE PREFERRED EMBODIMENTS

Fibre reinforced cement typically comprises i) A binder such as Portland cement, which is prepared, for instance, by adding a cure modifier such as calcium sulfate (gypsum) to a clinker prepared by firing a raw material consisting of iron oxide, quartzite, clay, and lime (CaO) at a high temperature and then pulverizing the mixture. Examples of Portland cement include early strength Portland cement, ultra-high early strength Portland cement, moderate-heat Portland cement, sulfate-resisting Portland cement, and white Portland cement. Additionally, examples of the binder other than Portland cement include blast furnace cement, silica cement, fly ash cement, and alumina cement. Range: about 10% to 60%, preferably about 20% to 50%, most preferably about 30% to 40% by total weight.

ii) Pozzolanic materials: Man-made pozzolanic materials (both amorphous and crystalline) including silica fume, microsilica, metakaolin, ground granulated blast furnace slag, and fly ash. Other naturally derived materials which, when finely divided, have been referred to as pozzolanic include pumice, perlite, diatomaceous earth, tuff, trass, etc iii) Siliceous material (preferably crystalline), the siliceous material may be present in an amount of from about 10-80 wt %, preferably about 30-70 wt %, preferably about 40-65 wt %. Preferably the siliceous material is ground sand (also known as silica) or fine quartz although amorphous silica is also suitable. Preferably the siliceous material has an average particle size of about 1-50 microns, more preferably about 20-30 microns.

iv) Reinforcing fibres: Suitable fibrous materials capable of producing a fibre reinforced product include cellulose such as softwood and hardwood cellulose fibres, non wood cellulose fibres, asbestos, mineral wool, steel fibre, synthetic polymers such as polyamides, polyesters, polypropylene, polyacrylonitrile, polyacrylamide, viscose, nylon, PVC, PVA, rayon, glass, ceramic or carbon. (vegetable, ceramic or polymeric), ranging between about 0.1% to 15% by total weight of composite solids, preferably about 5% to 12%, most preferably about 7% to 9%. Preferably, the reinforcing fibres comprise of cellulose fibres which are unrefined/unfibrillated or refined/fibrillated cellulose pulps from various sources, including but not limited to bleached, unbleached, semi-bleached cellulose pulp. The cellulose pulps can be made of softwood, hardwood, agricultural raw materials, recycled waste paper or any other forms of lignocellulosic materials. Cellulose fibres can be made by various pulping methods. In the pulping process wood or other lignocellulosic raw materials such as kenaf, straw, and bamboo, etc., are reduced to a fibrous mass by the means of rupturing the bonds within the structures of lignocellulosic materials. This task can be accomplished chemically, mechanically, thermally, biologically, or by combinations of these treatments. When cellulose fibres are used, they are preferably refined to a degree of freeness of between about 0 and 800 Canadian Standard Freeness (CSF), more preferably about 200-500 CSF.

v) Other additives/fillers, FRC composites can contain about 0-40 wt % of other additives such as fillers such as mineral oxides, hydroxides and clays, metal oxides and hydroxides, fire retardants such as magnesite, thickeners, colorants, pigments, water sealing agents, water reducing agents, setting rate modifiers, hardeners, filtering aids, plasticisers, dispersants, foaming agents or flocculating agents, water-proofing agents, density modifiers or other processing aids.

The fibre cement composites disclosed in preferred embodiments of the present invention may be formed from the water borne slurry by any of a number of conventional processes such as the Hatschek sheet process.

After forming, the green article may be pre-cured for a short time preferably up to about 80 hours at up to about 60° C. maximum temperature and high humidity, then it may be cured according to one or more of the following curing regimes:

Air curing: at up to about 60° C. maximum temperature and high humidity.

Steam curing: preferably in a steam environment at up to about 90° C. maximum temperature and atmospheric pressure for about 3 to 30 hours, most preferably for less than about 24 hours.

Autoclaving, preferably in a steam pressurised vessel at about 120 to 200° C. for about 3 to 30 hours, most preferably for less than about 24 hours.

The length of time and temperature chosen for curing is dependent on the formulation, the manufacturing process and form of the article.

With conventional high density FRC composites after forming and prior to curing, the product undergoes a pressing step where high pressure, ie up to about 30 MPa is applied to the formed article to give the desired thickness and density. The intention of this pressing is to reduce porosity, minimise water ingress, enhance interlaminar bonds and increase the resistance to delamination.

Figure 1:
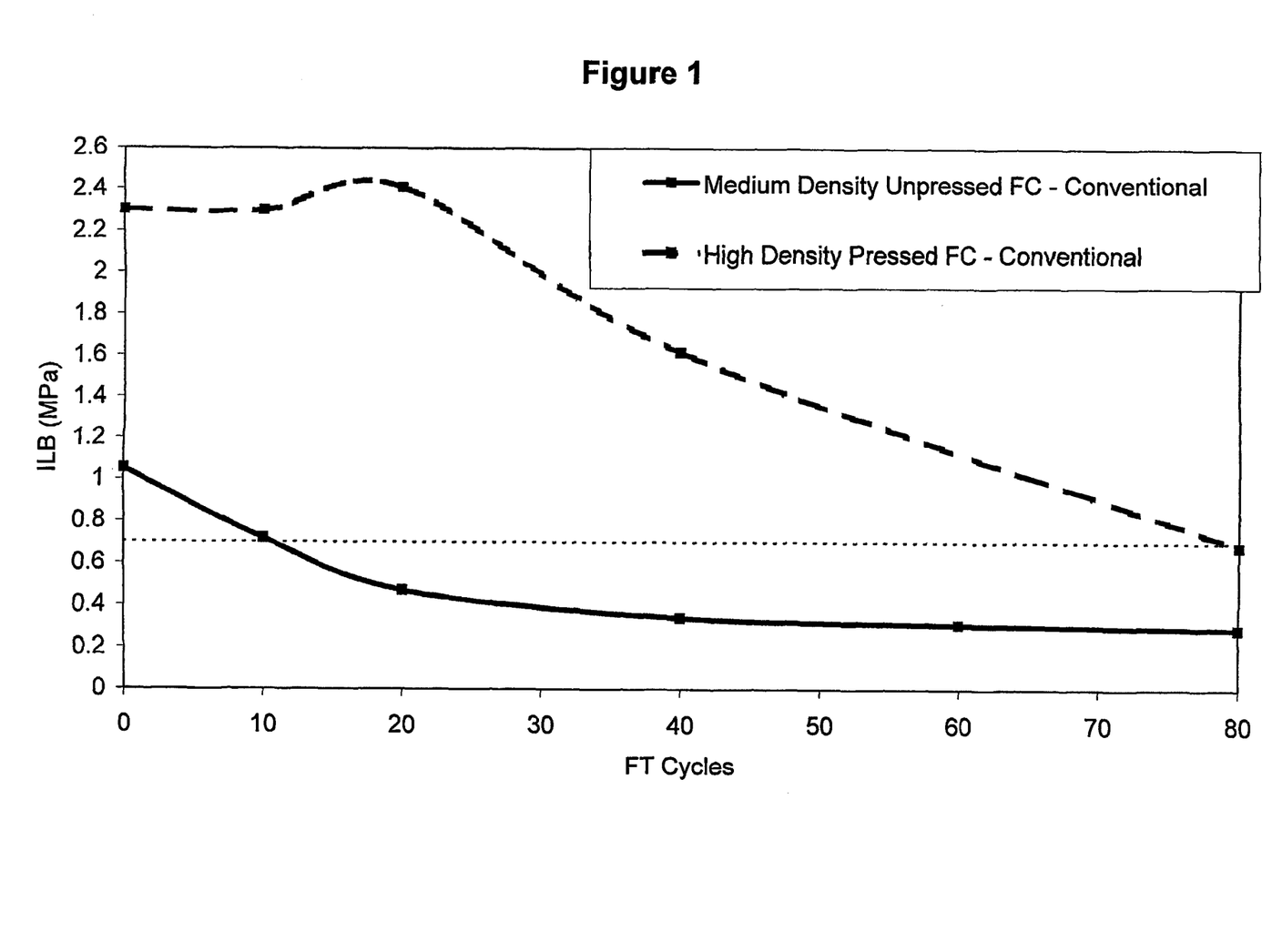
FIG. 1 is a graph of the freeze/thaw performance of high-density (pressed) and medium density (unpressed) conventional FRC composites.

FIG. 1 is a graph of a freeze/thaw cycle test comparing a conventional pressed fibre cement composite to an unpressed fibre cement composite. It can be seen that the unpressed composite exhibited significantly faster inter-laminar bond degradation (falling below 0.70 Mpa in 10 cycles) compared to a conventional high density pressed fibre composite which survives 80 cycles before it loses inter-laminar bond to the same degree.

Figure 2:
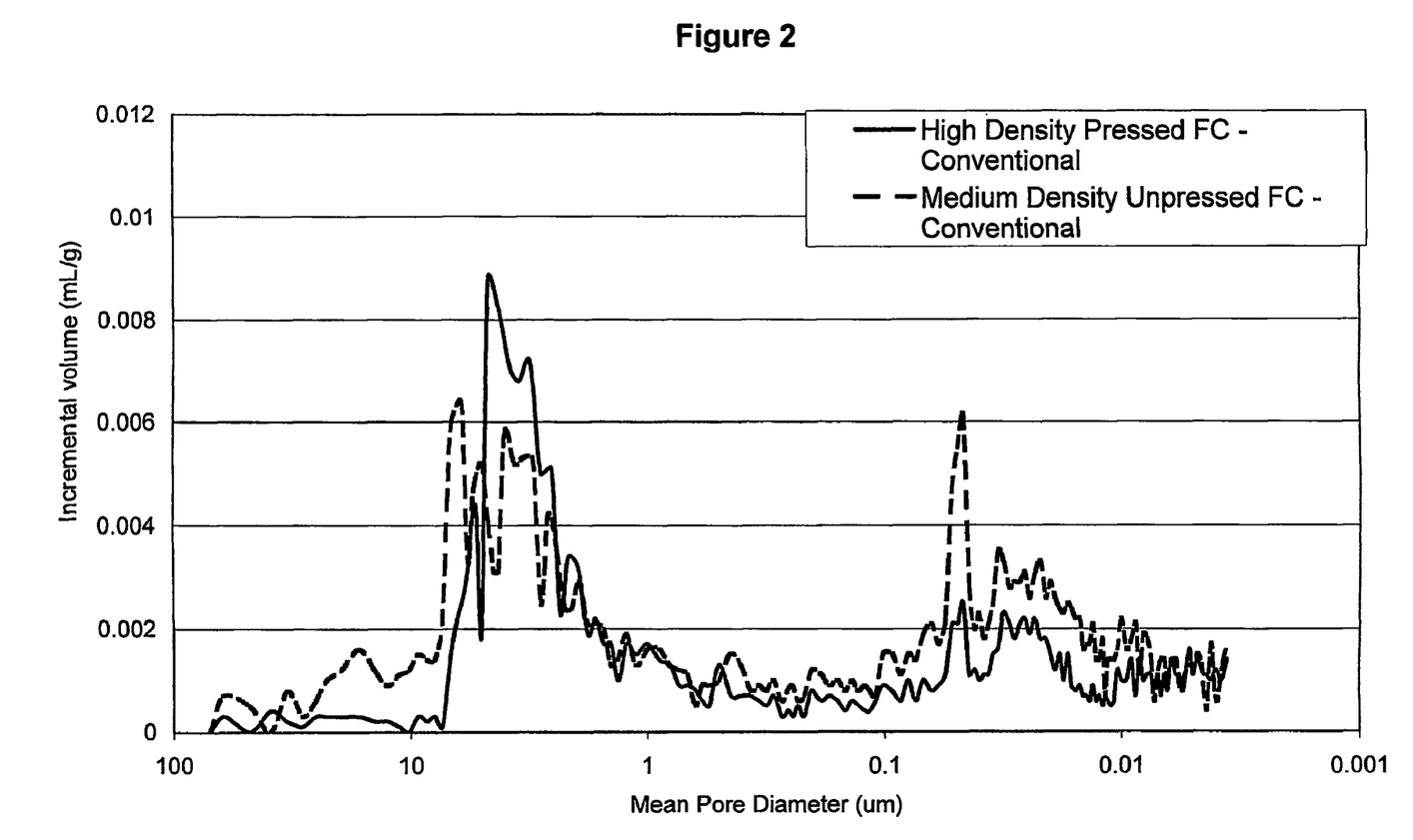
FIG. 2 is a graph of the pore size distribution of the conventional FRC composites of FIG. 1.

The pore size distribution of the conventional pressed and unpressed fibre cement composites are shown in FIG. 2.

This pore size distribution can be broken down into five major groupings as follows.

i) Air Pores (100-10 microns). These relate to macro pores caused by poor packing, fibre clumping, dewatering etc. Sometimes they are simply referred to as cracks or interlaminar pores.

ii) Fibre Pores (10-1 microns). These relate to pores inherent in the lignocellulosic fibres specifically due to their tubular structure and straw-like shape.

iii) Meso Pores (1-0.1 microns).

iv) Capillary Pores (0.1-0.01 microns). These relate to pores originating upon depletion of free water in the matrix.

v) Gel Pores (0.01-0.001 microns). These pores relate to the cement or binder micropores and are quite small in size and difficult to modify.

The Applicants have hypothesised that the properties of the fibre cement composite, in particular durability and workability in extreme climactic conditions may be linked to the pore size distribution in the resultant article and most particularly to the pore size distribution in the 100-10 micron size range (air pores) and 10-1 micron size range (fibre pores). Examinations of prior art fibre cement composites which exhibit good durability and workability in extreme climatic conditions appears to confirm relatively low pore volume in the critical air pore (100-10 microns) and fibre pore (10-1 microns) regions. Previous techniques of high pressure pressing, using synthetic polymeric fibres or high additions of micro silica to reduce pore volumes in these regions, has, as discussed above, proved expensive or has reduced workability.

Workability is generally defined as the ease to transport, handle, cut by score and snap, fix, eg nail and install the FC composite. Generally, workability is inversely proportional to density, ie composites with a lower density generally improve workability compared to higher density ones.

However, durability is generally directly proportional to density, ie high density composites exhibit better durability compared to lower density ones. Durability is generally regarded as the ability of the fibre cement composite to resist failure and continue performance in the presence of flaws (delamination or cracks) or other forms of damage or degradation for a specified period of time under specified environmental conditions. Such degradation systems include cyclic freeze/thaw or heat/rain, premature aging, microbial or chemical attack.

Accordingly, it will be clear to a person skilled in the art that the desired attributes of workability and durability cannot be met by the simple prior art mechanism of adjusting density. Rather, the Applicant's aim is to provide an FC composite with good durability and workability by modifying the pore size distribution at least in critical zones of the distribution, while maintaining a density lower than about 1.6 g/cm$^3$.

EXAMPLE 1

Lightly Pressed Medium Density Composite

In a first embodiment, a medium density composite product is produced in two stages. The first involves applying a density modifier to a conventional medium density FRC formulation to bring density down to the low density range, ie about 0.8 to 1.1 g/cm$^3$ thereby achieving improved stress relaxation behaviour and workability.

In this embodiment, the density modifying agent is microspheres but other density modifiers may be used. Microspheres can be natural, synthetic or a by-product. The material can be crystalline but is more typically amorphous or glass. One preferred type of microspheres are hollow ceramic microspheres commonly known as cenospheres. Cenospheres are a coal ash by-product that is typically separated from fly ash by a floatation process where the spheres float to the surface of water from clarifiers, ponds or lakes. The microspheres are available, for example, under the names Extendospheres, Recyclospheres and Zeeospheres, and are available from suppliers such as PQ Corporation of Chattanooga, Tenn.; Zeelan Industries Inc./3M of St. Paul, Minn.; Sphere Services, Inc. of Oak Ridge, Tenn.; The microspheres have typical particle sizes ranging from about 12 to 300 microns, with median particle sizes ranging about 80 to 120 microns. These sizes can, of course, vary between samples. The preferred microspheres typically contain about 62%-65% silica ($SiO_2$), about 23%-26% alumina ($Al_2O_3$) and about 3.0% to 4.0% iron oxides ($Fe_2O_3$). Range: about 1% to 30%, preferably about 2% to 20%, most preferably about 5% to 15% by total weight). Additional examples of formulating fibre cement composites using microspheres may be found in U.S. application Ser. No. 09/803,456 filed 9 Mar. 2001, entitled FIBER CEMENT BUILDING MATERIALS WITH LOW DENSITY ADDITIVES, the entirety of which is incorporated herein by reference.

A fibre cement composite is then produced using a waterbourne slurry of the density modified formulation by any conventional process. In this example and those discussed below, the Hatschek sheet process is used in which laminations of the formulation are applied to build up the thickness of the desired product. At this stage, the FC composite is still in the low to medium density range, ie about 0.8 to about 1.2.

The resultant FC composite is then subjected to a light press to densify the composite to a density within the medium density range, ie up to about 1.6 g/cm$^3$. This achieves improved delamination and water permeation resistance.

It should be understood, however, that this light press is not equivalent to the high pressure pressing of the prior art. According to one embodiment of the present invention, the content of density modifiers and extent of pressing are manipulated to provide the desired pore size distribution while still maintaining a density of less than about 1.6 g/cm$^3$. As discussed above, in the prior art, conventional high density FC composites apply pressures to achieve densities of over about 1.6 g/cm$^3$. This conventional technique does improve durability but may substantially decreases workability. The applicants have found that it is possible to improve various properties of the FC composite including durability and workability by starting with a low density formulation and applying a light press to form a medium density composite.

The light pressing regime according to one embodiment of the present invention can be divided into three parameters namely i) maximum pressure applied—between about 5 and 40 MPa, preferably about 10 to 30 and most preferably about 15 to 20 MPa, ii) ramping cycle—between about 10 and 40 minutes, preferably about 15 to 35 and most preferably about 20 to 30 minutes, and holding cycle—about between 15 and 30 minutes, preferably about 10 to 20 and most preferably about 5 to 10 minutes.

After pressing, the green article is precured for a short time, preferably up to about 80 hours at up to about 60° C. maximum temperature and high humidity, then autoclaved, preferably in a steam pressurised vessel at about 120 to 200° C. for about three to 30 hours, preferably less than about 24 hours.

As discussed above, other methods for curing the composite may be used, eg air curing or steam curing. The length of time and temperature chosen for curing is dependent upon the formulation, the manufacturing process and form of the article.

Figure 3:
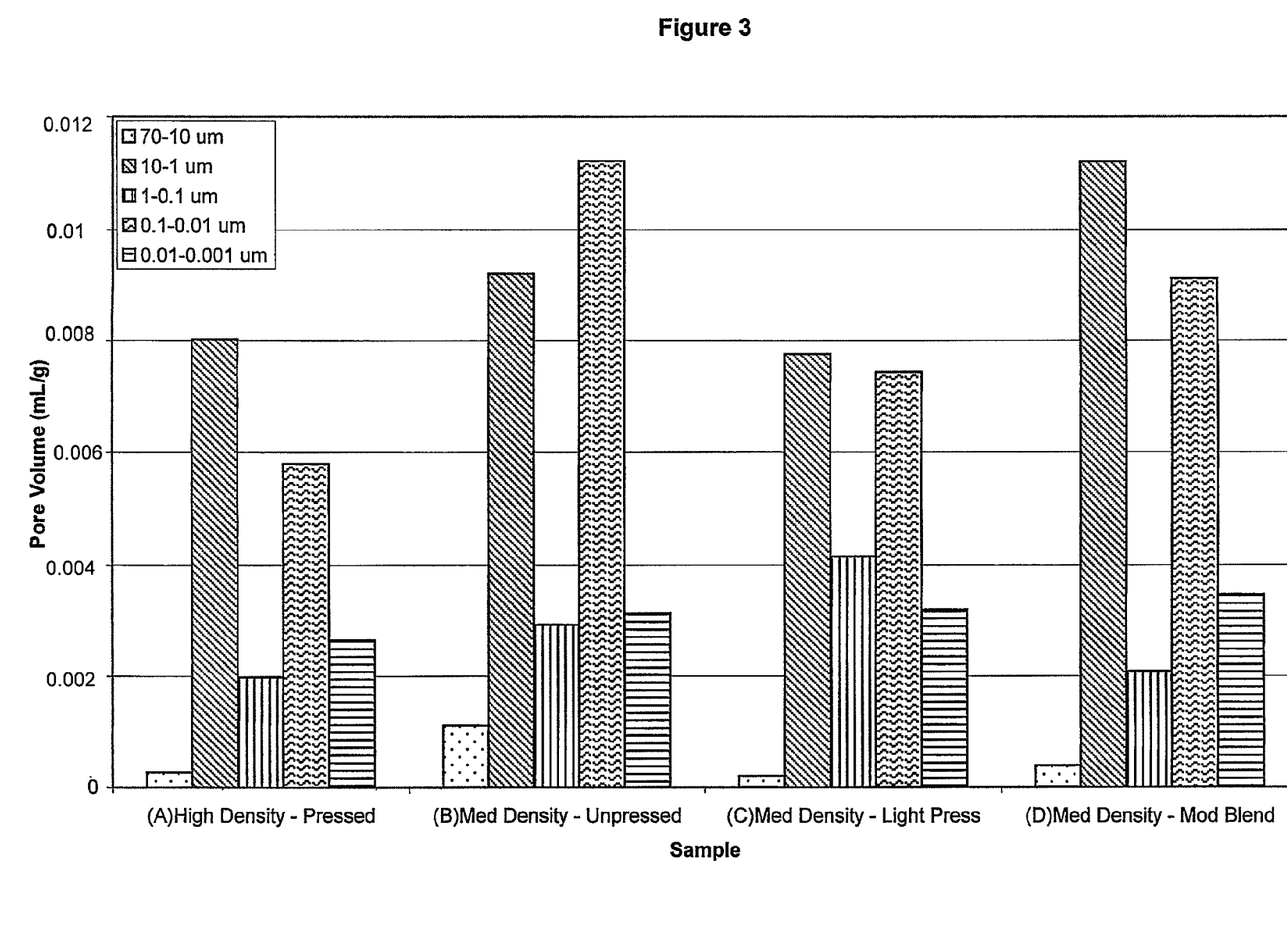
FIG. 3 is a graphical representation of the pore volumes in respective ranges for two FRC composites and an FRC composite produced according to one embodiment of the present invention.

The resultant light pressed medium density FC composite was then analysed to determine its pore volume. FIG. 3 is a comparative of the pore volumes of two medium density composites produced according to the preferred embodiments of the present invention and two conventional products. The first conventional product (A) is a pressed high density FC composite produced using the Hatschek process and generally used in roofing applications under moderate free/thaw exposure. This article is pressed using a maximum pressure of 30 MPa with a press cycle of 15 minutes ramping and 15 minutes holding.

The second conventional product (B) is an unpressed medium density composite, once again produced via the Hatschek process and suitable for use in roofing applications in mild climatic conditions. Sample (C) is a light pressed medium density FRC composite produced according to the above mentioned process. It can be seen from FIG. 3 that in the air pore range (70-10 microns) and fibre pore range (10-1 microns) the pore volume of (C) the light pressed medium density FC composite is comparable to the pore volume in the equivalent critical zone(s) of the high density product. The conventional medium density impressed product, in the other hand, has a much higher pore volume in the air pore and fibre ranges.

Sample (D) is a medium density composite produced using a modified blend and will be discussed below under example 2 in more detail.

Test 1—Freeze/Thaw Durability (Example 1)

The durability of the two conventional composites versus the light pressed medium density composite was compared.

The first and second products are the conventional medium-density FC impressed composite and high density FC composite outlined above.

The light pressed product is produced according to the process of Example 1 above, namely, a light pressed medium density FC composite once again produced using the Hatschek process. The product is light pressed using a maximum pressure of 15 MPa with a press cycle of 30 minutes ramping and 5 minutes holding.

The formulations for each are shown in Table 1.

TABLE 1

Formulations for unpressed, high density and light pressed composites (% by total weight)

| Formulation | Cement | Silica Flour | Pulp | Fire Retardant Filler | Ceramic Filler | Ceramic Microspheres |
|---|---|---|---|---|---|---|
| Medium-density Unpressed FC - (Conventional) | 35.0 | 53.0 | 8.0 | 4.0 | — | — |
| High density FC - 30 MPa (Conventional) | 39.6 | 48.4 | 8.0 | 4.0 | — | — |
| Light Pressed medium density FC - 15 MPa - (Example 1) | 35.0 | 45.0 | 8.0 | 2.0 | 2.0 | 8.0 |

The freeze/thaw performance was tested as follows: FC Samples (44 mm×44 mm squares) representing the three compositions were placed on one edge, half submerged in water in a plastic container, then exposed to freeze/thaw (F/T) cycling in an environmental chamber. The F/T regime consisted of 4 cycles per day; each cycle involved freezing and thawing of the sample over 6 hours including 1 hour freezing at −20° C. and 1 hour thawing at 20° C. The extent of degradation in the samples due to freeze/thaw exposure was determined by tensile testing in the z-direction to determine the Inter-Laminar Bond (ILB) strength (after 0, 10, 20, 40 and 80 cycles), which is a measure of the extent of delamination. A 0.7 MPa ILB limit was chosen as a lower limit measure of degradation due to freeze/thaw exposure.

Figure 4:
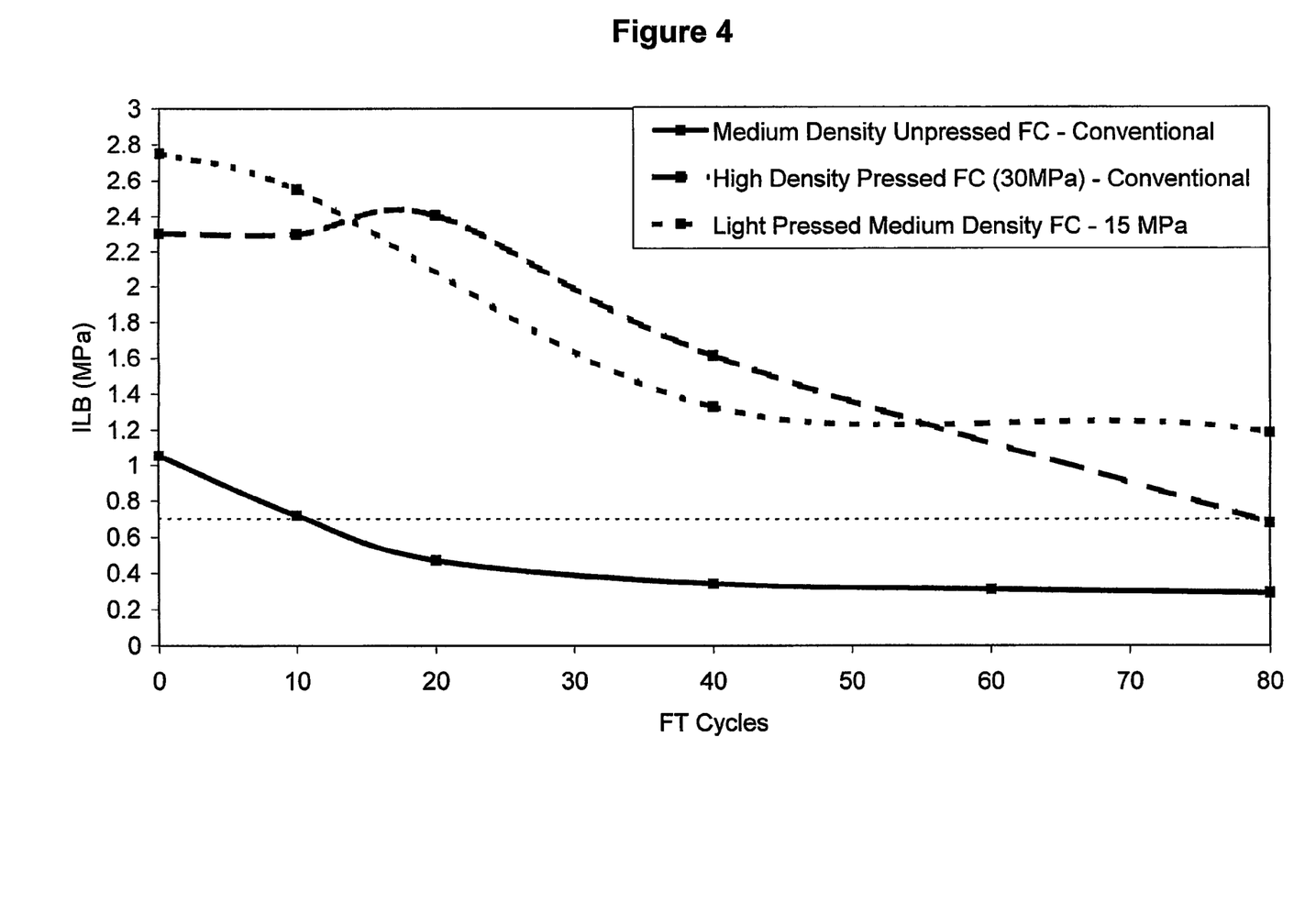
FIG. 4 is a graph of the freeze/thaw performance of high-density (pressed) and medium density (unpressed) conventional FRC composites and an FRC composite produced according to a first embodiment of the present invention.
Figure 5:
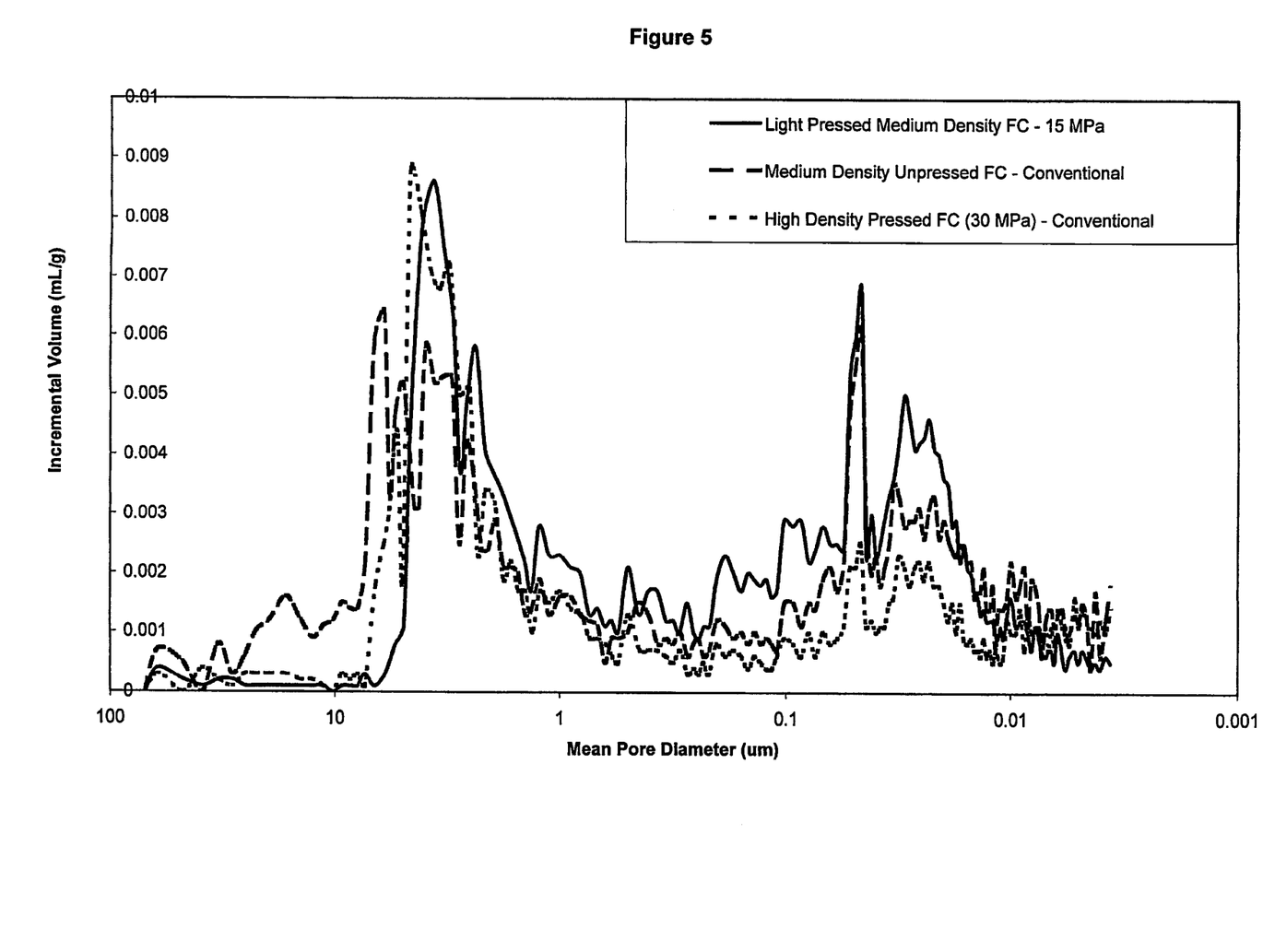
FIG. 5 is a graph of the pore size distribution of the FRC composite shown in FIG. 4.

The freeze/thaw performance and pore size distributions of all 3 products are shown in FIGS. 4 and 5 respectively.

It can be seen from FIG. 4 that once again, the ILB strength for the conventional Impressed medium density FC composite degrades below 0.7 MPa at around 10 cycles. The conventional high density pressed FC as discussed above, lasts for approximately 80 cycles. Most surprisingly, the light pressed medium density FC composite produced according to the preferred embodiments of the present invention continues above the 0.7 MPa line even after 80 cycles. Indeed as a comparison, both the conventional pressed high density FC composite and light pressed medium density composite of the preferred embodiments of the present invention exhibit around a 700% improvement in freeze/thaw durability compared to the standard FC composite.

Turning to FIG. 5, it can be seen that both the conventional high density FC composite and light pressed medium density composite of the preferred embodiments of the present invention exhibit lower porosity in the air pore zone (100-10 microns) and fibre pore zone (10-1 microns) as compared with conventional medium density products.

The fact that the freeze/thaw durability exhibited in the medium density FC product of the preferred embodiments of the present invention exceeds that of the conventional high density pressed composite is quite surprising and unexpected. The composite according to the preferred embodiments of the present invention exhibits lower density and hence, it is expected to perform worse under freeze/thaw conditions as compared with a conventional high density product. Further, both the conventional high density pressed composite and light pressed medium density composite of the preferred embodiments of the present invention exhibited comparable interlaminer bond strengths under substantially differing pressing regimes. This is quite surprising and contrary to conventional wisdom in this area.

Not wishing to be bound by any particular theory, it is speculated that the significant improvement in freeze/thaw durability exhibited in the embodiment of the invention discussed above, results from the combined effects of
- reduced moisture ingress due to reduced porosity in at least the critical zones of the pore size distribution. This is as a result of the light pressing
- enhanced stress relaxation in the lightly pressed modified composite due perhaps to the presence of the density modifying microspheres, which may enable it to accommodate more of the destructive stresses associated with freezing and thawing.
- higher fresh interlaminar bond strength and increased delamination resistance due to pressing.

Test 2—Mechanical Properties (Example 1)

The above mentioned test shows that the FC composite produced in accordance with the preferred embodiments of the present invention has a significant improvement in freeze/thaw durability as compared with conventional medium density FC composites. Indeed, the durability is comparable with conventional high density FC composites. As discussed above, however, such conventional high density FC composites may have reduced workability, ductility, nailability, etc compared to their medium density counterparts.

Accordingly, a conventional high density FRC composite and a light pressed medium density FRC composite produced according to the preferred embodiments of the present invention were evaluated for their flexural properties.

250 mm×250 mm squares were tested in flexure (in air-dry conditions) in two directions. The flexure testing data is shown in Table 2 below. Unless otherwise stated all the density values disclosed herein relate to air-dry (equilibrium) condition, with an approximate moisture content range of 5%-10% by weight.

TABLE 2

Flexure testing data (air-dry condition)

| Formulation | Density gm/cm$^3$ | Avg. MoR MPa | B-A Energy KJ/m$^3$ | Ult. strains um/m | MoE GPa |
|---|---|---|---|---|---|
| Conventional High Density Pressed FC (30 MPa) | 1.68 (within high density range) | 27.43 | 2.31 | 2631 | 12.86 |
| Light Pressed Medium Density FC (15 MPa) | 1.46 (within medium density range) | 23.41 | 12.97 | 7793 | 6.78 |

Table 2 shows that the ductility, ie ultimate strain to failure, of the light pressed medium density FC composite according to the preferred embodiments of the present invention is around 300% that than corresponding to the conventional high density pressed FC, ie increased from 2631 um/m to 7793 um/m. This is a very surprising result and indicates that a light pressed medium density composite according to the preferred embodiments of the present invention is potentially able to withstand much higher strain before failing as compared to the conventional high density pressed FC composites.

The same could be said about the B-A (impact) energy which increased by more than about 500% (2.31 to 12.97 Kj/m$^3$).

While these results may not be typical of all light pressed medium density composites made according to the preferred embodiments of the present invention, it is significant to note that preferred embodiments of the present invention provide a light press medium density FC composite with improved characteristics over conventional products such as improved durability, high ductility (easier to nail, better cracking resistance), lighter weight (improved workability and easier to handle) and improved impact resistance (hail resistant etc).

EXAMPLE 2

Modified Formulation/Blend FRC Composite

As an alternative to the light pressing technique discussed above in example 1, in a second embodiment the properties of a low or medium density FRC product are altered by modifying the typical FRC composite formulation. This modification involves the addition of:
 i) lignocellulosic fibres chemically treated with a water repellant agent,
 ii) reinforcing fibers
and
 ii) microfine siliceous material.

The lignocellulosic fibres suitable for use with the preferred embodiments of the present invention are chemically treated with a water repellent agent to impart hydrophobicity. They are provided in an amount of 0.01% to 9% by total weight of composite solids and preferably in the 2 to 3% range.

Lignocellulosic fibres chemically treated with a water repellent agent to impart hydrophobicity, range: between about 0.01% to 9% by total weight of composite solids, preferably in the about 2% to 4% range.

The lignocellulosic fibres as described in the preferred embodiments of the present specification is a generic term for cellulose fibres made from softwood or hardwood, bamboo, sugarcane, palm tree, hemp, bagasse, kenaf, wheat straws, rice straws, reed, and the like. Moreover, lignocellulosic fibre material is a generic term for the above fibres having such shapes as needle-like, chip-like, thin section-like, strand-like, rod-like, fibre-like, flake-like, and the like. It is to be noted that there is no particular restriction on the shape of these lignocellulosic fibres, but it is preferable that those having an average fibre length of about 0.50-50 mm, and an average fibre diameter or average fibre thickness of about 0.5 mm or less be used. Moreover, lignocellulosic fibres may be a mixture of two or more of the above fibres.

Preferably, lignocellulosic fibres comprise of cellulose fibers which are unrefined/unfibrillated or refined/fibrillated cellulose pulps from various sources, including but not limited to bleached, unbleached, semi-bleached cellulose pulp. The cellulose pulps can be made of softwood, hardwood, agricultural raw materials, recycled waste paper or any other forms of lignocellulosic materials. Cellulose fibers can be made by various pulping methods. In the pulping process wood or other lignocellulosic raw materials such as kenaf, straw, and bamboo, etc., are reduced to a fibrous mass by the means of rupturing the bonds within the structures of lignocellulosic materials. This task can be accomplished chemically, mechanically, thermally, biologically, or by combinations of these treatments.

In one embodiment of the invention, the lignocellulosic fibres have surfaces that are at least partially treated with a water repellent agent so as to make the surfaces hydrophobic. The water repellent agent comprises a hydrophilic functional group and a hydrophobic functional group, wherein the hydrophilic group permanently or temporarily bonds to hydroxyl groups on the fiber surface in the presence of water or an organic solvent in a manner so as to substantially prevent the hydroxyl groups from bonding with water molecules. The hydrophobic group is positioned on the fiber surface and repels water therefrom.

As discussed above, the reinforcing fibres for the FC composite formulation may also be formed of cellulose. If this is the case, a portion of the cellulosic reinforcing fibres may be treated with the water repellent agent to satisfy component (i) mentioned above. Of course, if the reinforcing fibres are made from materials other than cellulose, e.g. polymer, additional treated lignocellulosic fibres are preferably added to the formulation as component (i).

In another embodiment of the invention, each water repellent agent molecule has a hydrophilic functional group comprising silanol (Si—OH) or polysilanol (Si—(OH)$_n$, where n=2, 3 or 4) and a hydrophobic functional group comprising straight or branched alkyl chains or aromatic fragments. The silanol or polysilanol may be resulted from the hydrolysis of hydrolysable alkoxy fragments that attach to a silicon element.

The water repellent agent may be applied to the fiber surfaces using methods including vacuum deposition, pressure spraying, dipping or treating the fibres in aqueous or solvent solutions containing the water repellent chemicals.

Chemical compounds that can be used as water repellent agents include, but are not limited to:
silane derivatives of all kinds and in all formulations, alkoxylsilane of all kinds and in various formulations, silicone emulsions of all kinds and in various formulations.

The water repellent agents can be in a dry form such as powders, or wet form such as emulsions, dispersions, latexes and solutions. When multiple sizing agents are applied, some can be in dry form and others in wet form.

The water repellent agent can comprise about 50% of the dry weight of the lignocellulosic fibres, most preferably, approximately 0.01 to 10% of its weight.

Further details regarding the chemical treatment of fibres using emulsified sizing (water repellent) agents are described in copending International PCT Application Number PCT/US01/29675 entitled FIBRE CEMENT COMPOSITE MATERIAL USING SIZED CELLULOSE FIBRES, filed on 21 Sep. 2001, and U.S. application Ser. No. 09/969,742, filed 2 Oct. 2001, entitled FIBER CEMENT COMPOSITE MATERIALS USING SIZED CELLULOSE FIBERS, the entirety of both of which are incorporated herein by reference.

The microfine silica is preferably added in the range of about 0.1 to 10% and preferably about 2 to 4% of the total weight of dry solids. Microfine refers to the particles being essentially less than about 10 microns and preferably less than about 5 microns. Examples include silica fume which is an amorphous spherical silica by-product from the manufacture of pherosilica and silicone metal and refined natural micro silica. While crystalline silica can be used, amorphous silica is preferred and the Applicant has found that best results are achieved when the $SiO_2$ content in this additive is at least about 85% by weight.

Referring back to FIG. 3 and Sample (D) which is a medium density FRC composite produced according to the modified formulation/blend, it can be seen that in the air pore region (70-10 microns) the total pore volume is comparable with the high density product. The fibre pore volume (10-1 micron) is greater than the high density product, however, as will be discussed below, it is a combination of pore modification and water repellent nature of the fibres which improves the properties of the modified blend FC composite.

Test 3—Freeze/Thaw Durability (Example 2)

The freeze/thaw durability for the unpressed durable blend FC composite was tested as compared with a conventional medium density unpressed product and conventional pressed high density product.

The first and second composites are identical to the comparative examples given above in Table 1. The third composite is an unpressed medium density modified blend according to example 2 and produced via the Hatschek process.

The formulations of the three composites are shown in Table 3 below.

TABLE 3

Formulations for unpressed (standard), unpressed (durable), and high density pressed composites (% by total weight)

| Formulation | Cement | Silica Flour | Component 2 Untreated Reinforcing Fibre (cellulose) | Component 1 Treated Fibre (Cellulose) | Component 1 Water Repellent Additive (Silane) | Total Fibre Content | Component 3 Microfine Silica (Silica Fume) | Fire retardant (Filler) |
|---|---|---|---|---|---|---|---|---|
| Medium-density FC - Unpressed (Conventional) | 39.6 | 48.4 | 8.0 | 0.0 | 0.0 | 8.0 | 0.0 | 4.0 |
| High density FC - 30 MPa (Conventional) | 35.0 | 53.0 | 8.0 | 0.0 | 0.0 | 8.0 | 0.0 | 4.0 |
| Modified Blend Medium Density FC (Example 2) | 30.0 | 60.0 | 2.70 | 2.90 | 0.32 | 5.6 | 30. | 0.0 |

Samples representing the three composites were tested under cyclic freeze/thaw as described in example 1. The extent of degradation in the samples due to freeze/thaw exposure was determined by tensile testing in the z-direction to determine the Inter-Laminar Bond (ILB) strength (which is a measure of the extent of delamination) after 0, 10, 20, 40 and 80 cycles.

Figure 6:
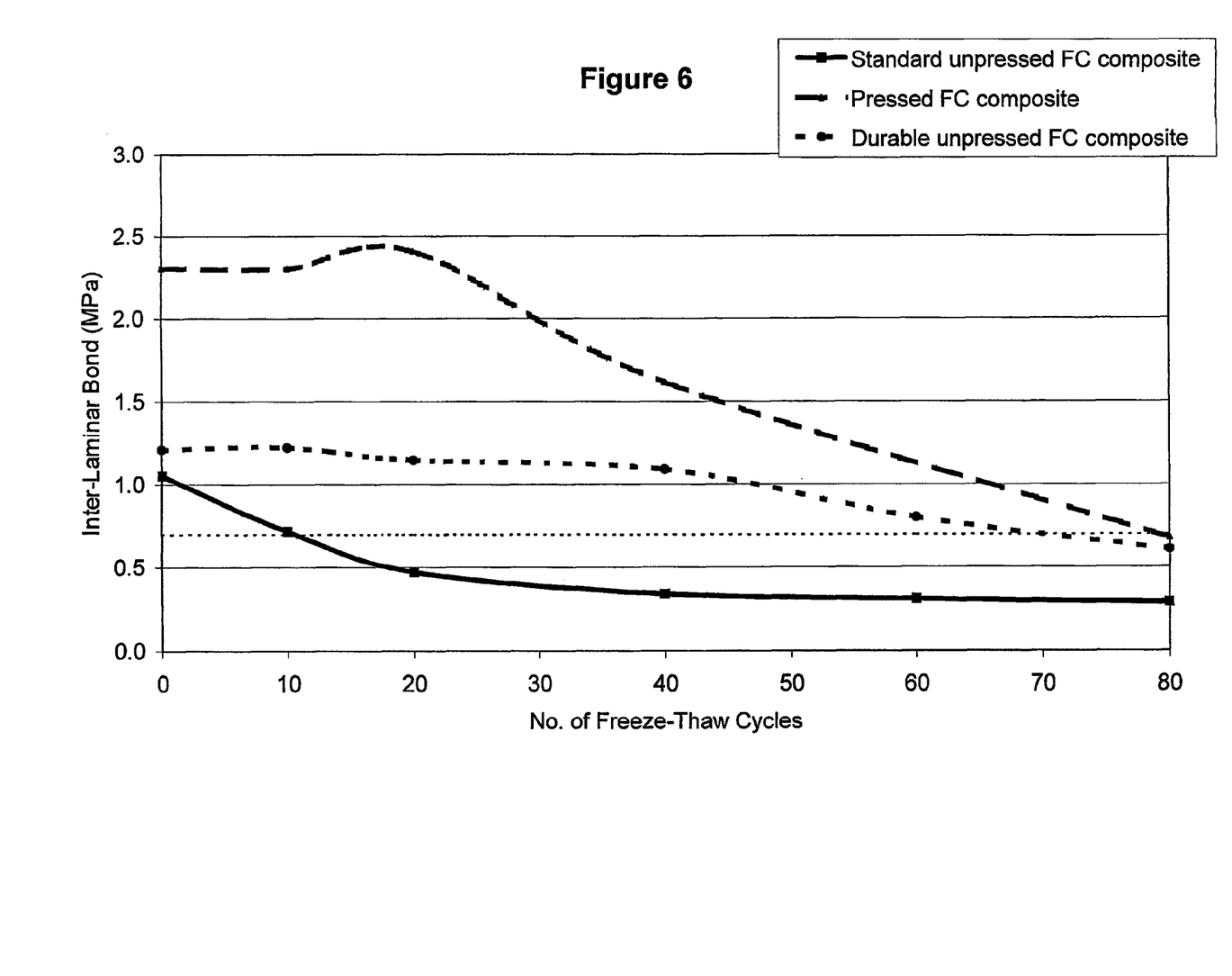
FIG. 6 is a graph of the freeze/thaw performance of high-density (pressed) and medium density (unpressed) conventional FRC composites and an FRC composite according to a second embodiment of the present invention.
Figure 7:
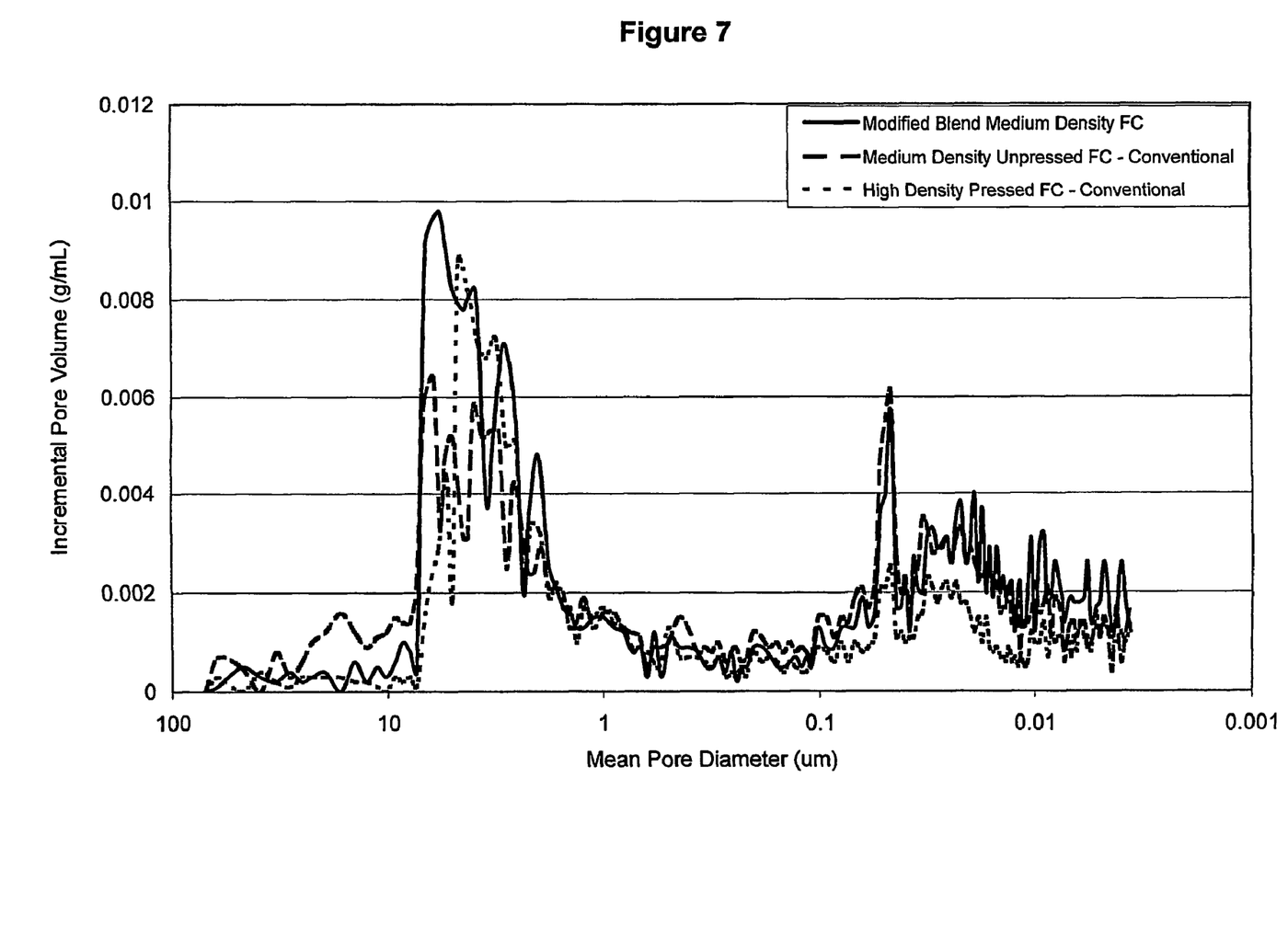
FIG. 7 is a graph of the pore size distribution of the FRC composite of FIG. 6.

The freeze/thaw performance and pore size distributions of all 3 products are shown in FIGS. 6 and 7 respectively.

It can be seen that the unpressed durable blend FC composite in accordance with the preferred embodiments of the present invention provide a significant improvement in freeze/thaw durability over the conventional unpressed medium density FC composite.

Indeed, both the conventional high density FC composite and unpressed modified blend medium density composite according to the preferred embodiments of the present invention exhibit about 700% improvement in freeze/thaw durability compared to the standard FC composite. Both achieve around 70 freeze/thaw cycles above the failure line.

Turning to FIG. 7, it can be seen that as will Example 1, the conventional high density pressed FC product and modified blend FC composite according to the preferred embodiments of the present invention exhibit significantly lower porosity in the air pore zone. (100-10 microns) and fibre pore zone (10-1 microns) as compared with the conventional medium density product.

The improvement in freeze/thaw durability exhibited by the modified blend FC composite according to the preferred embodiments of the present invention is surprising and quite unexpected.

Analysis of the interlaminar bond strength, capillary porosity and water absorbtivity of the modified blend FC composite according to the preferred embodiments of the present invention as well as the two conventional comparative FC composites was conducted. The results are shown in Table 2 below.

Conventional wisdom predicts that the freeze/thaw durability improvement arising from high density pressed FC products stems from the high fresh MB (2.30 MPa) and low porosity of the densified matrix (air-dried density of 1.7 g/cm$^3$). This is caused by the high pressure pressing of the product prior to curing. It is therefore surprising that the modified blend FC composite of the preferred embodiments of the present invention which does not undergo pressing and exhibits a low fresh ILB (1.2 MPa) and high overall porosity (air-dried density of 1.3 g/cm$^3$) can match the freeze/thaw durability improvement of the conventional high density product.

In addition, since the modified blend unpressed FC composite of the preferred embodiments of the present invention would normally be lighter in weight, lower in cost and more workable, ie easier to handle and cut, than the conventional high density FC product, while at the same time exhibiting comparable durability, it presents an attractive alternative to conventional materials.

Not wishing to be bound by any particular theory, the Applicant speculates that improvement in freeze/thaw durability of the unpressed modified blend FC composite according to the preferred embodiments of the present invention, arises due to the combined synergistic effect of the hydrophobic cellulose fibres and the blocked or segmented matrix pores due to silica fume reactivity. This combination increases the resistance to moisture ingress thereby improving freeze/thaw durability.

The above explanation is supported by the water/absorption data shown in Table 4 in which the conventional high density pressed FC composite and unpressed modified blend FC composite according to the preferred embodiments of the present invention exhibit between 20 and 30% lower water absorption values compared to the conventional impressed medium density FC product.

TABLE 4

Porosities and ILB values of the three FC composites.

| Composition | Inter-Laminar Bond Strength (ILB), MPa | 48 hour Water Absorption, % weight |
|---|---|---|
| High Density Pressed FC | 2.30 | 26.03 |
| Convention Unpressed FC | 1.05 | 32.38 |
| Unpressed Modified Blend FC | 1.20 | 23.04 |

FIG. 7 also clearly shows that a conventional high density pressed FC product and unpressed modified blend FC composite according to the preferred embodiments of the present invention which both show good freeze/thaw durability, exhibit significantly lower pore volumes in the fibre pore zone (10-1 microns) and air pore zone (100-10 microns) compared to the unpressed medium density FC composite.

Test 4—Moisture Resistance (Example 2)

As a further analysis, moisture resistance parameters corresponding to conventional unpressed material and the modified blend unpressed FC composite of the preferred embodiments of the present invention were assessed. The results are shown in Table 5 below.

TABLE 5

Wicking height results for unpressed durable and standard FC composites.

| Composition | Wicking height after 48 hours, mm | Water permeation rate after 48 hours ML/hr/0.002 m² |
|---|---|---|
| Conventional Unpressed FC | 207 | 113 |
| Unpressed Modified Blend FC | 43 | 31 |

The water permeation rate was measured on a 250 mm by 250 mm by 6 mm sample, laid flat and attached to a 100 mm high, 50 mm diameter Perspex column filled with water and monitored for extent of permeated water volume of 48 hours. Wicking height was measured on a 250 mm by 250 mm by 6 mm sample laid on edge in a flat tray in an upright position and monitored for wicking height progression over 48 hours. It can be seen that the unpressed modified blend FC composite exhibited more than about a 70% reduction in wicking height and water permeation rate compared to the conventional unpressed FC composite.

Once again, these results are quite surprising in view of conventional understanding. Water permeability may be reduced by pore filling, segmenting or pressing. Wicking on the other hand is much more difficult to control in medium density FC products which contain cellulose fibre due to their small diameter and tubular structure which promotes wicking along the fibre direction by capillary action.

It is also surprising that the low silica fume addition level in the modified blend according to the preferred embodiments of the present invention is sufficient to impart significant moisture resistance and durability improvement as compared with a conventional product. In current fibre cement technology, typical levels of silica fumes are 5 to 10%. The silica fume addition of the preferred embodiments of the present invention is around 2 to 4% and this level is generally considered to low to modify the properties of the medium density FC composite.

Test 5—Workability (Example 2)

As with Example 1, the workability, handleability and nailability of the FC composite produced according to preferred embodiments of the present invention was tested. Samples representing the conventional unpressed medium density FC product and the unpressed modified blend FC product according to preferred embodiments of the present invention were subjected to flexure tests. Handleability was taken as the ultimate strain value in the B direction corresponding to a 100 mm by 200 mm by 6 mm sample tested in flexure in saturated conditions. A 5000 um/m ultimate strain value is generally considered the minimum for good handleability. Edge nailability was assessed by gun nailing at 13 mm from the edge onto a 250 mm by 250 mm by 6 mm sample and rating the extent of cracking. A numerical rating below 1 is considered very good nailability.

The results are shown in Table 6.

TABLE 6

Handleability & nailability results for unpressed durable and standard FC composites.

| Composition | Ult. strain b-direction (sat. condition), um/m (*) | Nailability rating (13 mm from edge) (**) |
|---|---|---|
| Conventional Unpressed FC | 9095 | 0.79 |
| Unpressed Modified Blend FC | 11433 | 0.38 |

(*) minimum 5000 um/m for good handleability.
(**) <1 rates: very good nailability.

It can be seen from Table 6 that the unpressed modified blend FC composite according to the preferred embodiments of the present invention exhibited very good handleability and nailability properties as compared with the conventional unpressed medium density product. Once again, these results are quite surprising since the modified blend FC composite according to the preferred embodiments of the present invention has a relatively low total fibre content, ie around 5.6% (see Table 3) as compared to 8% in standard FC composites. Such a low fibre content is outside the range commonly adopted in cellulose FC production, ie 7 to 9% and accordingly, the FC composite is expected to exhibit a very low ultimate strain value, ie brittle failure, and poor nailability.

Accordingly, it can be seen that the unpressed modified blend FC composite according to the preferred embodiments of the present invention surprisingly achieves an improvement in freeze/thaw durability (comparable with conventional high density FC composites) and at the same time maintains or improves workability (handleability and nailability improves over conventional medium density products).

The embodiments shown above provide two alternatives for modifying the properties of a low or medium density FC composite. In one embodiment, a low or medium density formulation undergoes a light press while maintaining a density lower than about 1.6 g/cm³. In the second embodiment, a modified blend is used in the original formulation.

Both embodiments show significantly improved properties over conventional medium density FC products and in particular improved freeze/thaw durability while maintaining or improving workability. The resultant products have industrial application in a wide range of areas including exterior or interior use, roofing applications, wet area FC lining, etc.

While the present invention has been described with reference to the above examples, it would be appreciated that other embodiments, forms or'modifications may be produced without departing from the spirit or scope of the invention as broadly described herein.

The invention claimed is:

1. A method of modifying the properties of a low or medium density FRC, fiber reinforced cement, product comprising:

applying a density modifier to a low or medium density FRC product having a density from about 1.2 to 1.6 g/cm³, wherein the density modifier reduces the density of the low or medium density FRC product to between about 0.8 to 1.1 g/cm³;

densifying said low or medium density FRC product to a density of no greater than about 1.6 g/cm³, wherein densifying the low or medium density product comprises applying a light press comprising applying about 5 to 40 MPa to the cementitious matrix with a ramping cycle between 10 to 40 minutes and a holding cycle of between 15 to 30 minutes; and curing said low or medium density FRC product, wherein the cured low or medium density FRC product has a predetermined pore size distribution such that in particular critical zones of said distribution, the pore volume is substantially equivalent to or less than the pore volume in a respective critical zone of a conventional high density FRC product.

2. A method as claimed in claim 1 wherein the predetermined pore size distribution is obtained by physical modification.

3. A method as claimed in claim 1 wherein the pressure applied is sufficient to provide the predetermined pore size distribution but maintain a density of between about 1.1 and 1.55 g/cm$^3$.

4. A method as claimed in claim 1 wherein the critical zones of said pore size distribution are in the region of 1 to 10 microns mean pore diameter size and/or in the region of 10 to 100 microns mean pore diameter size.

5. A method as claimed in claim 1 wherein the predetermined pore size distribution is obtained by a combination of chemical and physical modifications.

6. A method as claimed in claim 1 a predetermined pore size distribution is obtained to provide improved freeze/thaw durability to the FRC product.

7. A method as claimed in claim 1 wherein a predetermined pore sized distribution is obtained to provide reduced propensity to carbonation or differential carbonation of the FRC product.

* * * * *